United States Patent Office 3,276,950
Patented Oct. 4, 1966

---

3,276,950
METHOD FOR CONTROLLING ARACHNIDS
Arthur W. Engelhard, Bradenton, Fla., assignor to E. I. du Pont de Nemours and Company, Wilmington, Del., a corporation of Delaware
No Drawing  Filed May 10, 1965, Ser. No. 454,722
8 Claims. (Cl. 167—22)

This invention relates to bis(dialkylcarbamoyl)disulfides.

More specifically, this invention refers to the use of bis(dialkylcarbamoyl)disulfides for controlling or extirpating arachnids of the order Acarina.

The numerous species of Acarina, commonly known as mites, found throughout the world cause vast amounts of suffering and economic loss through attack on humans, animals, and plants. The problems caused by mites are a consequence of the development of excessive mite populations resulting from successive short generations. One female mite can give rise in one month to a total progeny of well over 13,000,000 mites as a result of succeeding short generations.

Moreover, mite populations have been found to increase when the site of their infestation is treated with some insecticides such as DDT. This probably occurs because the insecticide, while failing to control the mites, removes large numbers of the mites' natural enemies such as predacious insects and spiders.

Mites have been difficult to control for several other reasons. Their well protected respiratory system makes them highly resistant to ordinary contact sprays and fumigants that their host can tolerate. In the quiescent stage mites are highly resistant to most chemicals and few safe treatments have been discovered that will kill mite eggs.

In view of the above, and in view of the frequency of mite infestation throughout the plant and animal worlds, compounds that will control these particular pests and, at the same time provide adequate safety margin for the host plant or animal, are much sought after.

I have discovered that the compounds of the following formula are effective in controlling or extirpating mite populations:

(1)
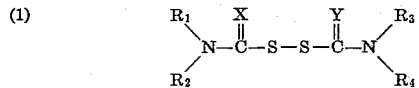

wherein $R_1$, $R_2$, $R_3$ and $R_4$ are the same or are different and are alkyl of one to 6 carbons or cycloalkyl of three to six carbons; and X and Y are oxygen or sulfur; provided however that $R_1$ can be joined with $R_2$, and $R_3$ can be joined with $R_4$ to form a ring of 5 to 8 carbons, and with the limitation that $R_1$, $R_2$, $R_3$ and $R_4$ cannot all be methyl.

As pointed out above, mite problems are caused basically by the rapid increase in mite populations due to successive short generations. The compounds of this invention alleviate this problem through prevention of mite reproduction. More particularly, the compounds of this invention cause the death of mite embryos when applied to the mite eggs or when mite eggs are laid on a surface which has been treated with a compound of this invention. The death of the mite embryo takes place either before the eggs are ready to hatch or immediately upon hatching.

Thus, the compounds of this invention prevent the addition of new individuals to the mite population and, in combination with the high level of natural mite mortality, can greatly reduce or eliminate mite infestation in a treated area.

Preferred bis(dialkylcarbamoyl)disulfides of Formula 1, because of their particularly outstanding activity in the control of mite populations and their ease of formulation to compositions giving excellent residual protection, are those in which X and Y are sulfur. Representative of the preferred compounds of this invention are the following:

bis-(N-n-butyl-N-methylthiocarbamoyl)disulfide
bis-(N-ethyl-N-isopropylthiocarbamoyl)disulfide
bis-(N,N-diethylthiocarbamoyl)disulfide
bis-(N,N-di-isobutylthiocarbamoyl)disulfide
bis-(N,N-di-isopropylthiocarbamoyl)disulfide
bis-(N,N-di-sec-butylthiocarbamoyl)disulfide

PREPARATION

The bis(dialkylcarbamoyl)disulfides of this invention can be prepared from sodium disubstituted thio- and dithiocarbamates as shown below.

(A)
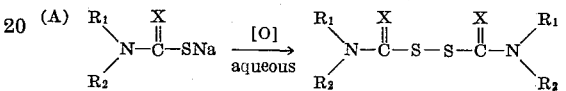

where
[O] is an oxidizing agent, X is oxygen or sulfur, and $R_1$ and $R_2$ are as in Formula 1.

The above method is carried out in aqueous medium to produce satisfactory yields of the active compounds of this invention. Oxidizing agents such as chlorine, hydrogen peroxide and persulfate salts can be employed.

By starting with mixtures of N,N,-disubstituted thiol or dithiocarbamate salts, active mite-controlling mixtures are obtained. Such mixtures can be used directly without the requirement for separation of the individual components as for example:

(B)
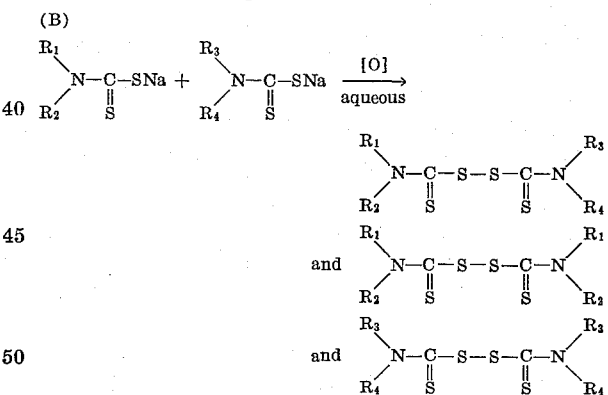

or
(C)
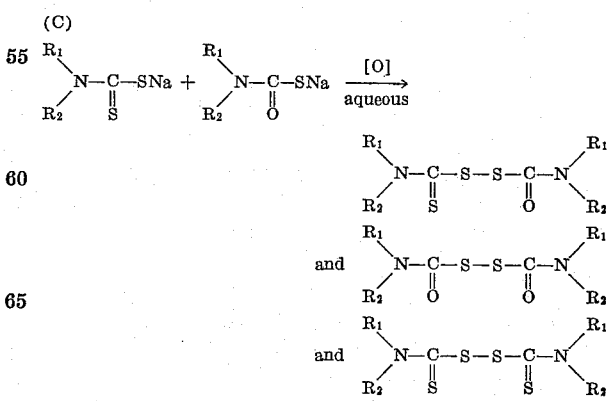

COMPOSITIONS

Control or extirpation of mites is accomplished by applying a coating of one of the compounds of this invention to a plant, animal or inanimate surface upon which mite eggs are present or may be subsequently laid. Such a coating can be obtained through the use of dusts, sprays, or aerosols carrying the active ingredient.

Such compositions can contain, in addition to the active ingredient of this invention, conventional insecticides, miticides, fungicides, bacteriacides, nematocides or other agricultural chemicals such as fruit set agents, fruit thinning compounds, fertilizer ingredients and the like so that the compositions can serve useful purposes in addition to the control or extirpation of mite infestations. The following are illustrative of the agricultural chemicals that may be included in compositions of the compounds of this invention or, additionally, that may be added to sprays containing one or more of the compounds of this invention.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a,4,7,7a-tetrahydroindane;
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1(or 3a),4,5,6,7,8,8-heptachloro-3a,4,7,7a-tetrahydro-4,7-methanoindene;
1,1,1-trichloro-2,2-bis(p-methoxyphenyl)ethane (methoxy-chlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate ("Sevin"®)
methylcarbamic acid, ester with phenol, 4-(dimethylamino)-3,5-dimethyl;
methylcarbamic acid, ester with 1,3-dithiolan-2-one oxime;
O,O-diethyl-O-[2-isopropyl-4-methylpyrimid-6-yl]thiophosphate;
O,O-dimethyl-1-hydroxy-2,2,2-trichloroethyl phosphonate;
O,O-dimethyl-S-(1,2-dicarbethoxyethyl)dithiophosphate (malathion);
O,O-dimethyl-O-p-nitrophenyl thiophosphate (methyl parathion);
O,O-diethyl-O-p-nitrophenyl thiophosphate (parathion);
O,O-dimethyl-O-(3-chloro-4-nitrophenyl)thiophosphate;
di-2-cyclopentenyl-4-hydroxy-3-methyl-2-cyclopenten-1-one chrysanthemate;
O,O-dimethyl-O-(2,2-dichlorovinyl)phosphate (DDVP);
mixture containing 53.3% "Bulan," 26.7% "Prolan" and 20.0% related compounds:
O,O-dimethyl-O-(2,4,5-trichlorophenyl)phosphorothioate;
O,O-dimethyl-S-(4-oxo-1,2,3-benzotriazine-3(4H)-ylmethyl)phosphorodithioate ("Guthion"®);
bis-(dimethylamino)phosphonous anhydride;
O,O-diethyl-O-(2-keto-4-methyl-7-a'-pyranyl)thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate);
O,O-diethyl-O-(2-(ethylmercapto)ethyl)thiophosphate;
2,4-dinitro-6-sec-butyl phenol;
toxaphene;
O-ethyl-O-p-nitrophenylbenzenethiophosphonate;
4-chlorophenyl-4-chlorobenzene sulfonate;
p-chlorophenyl-phenyl sulfone;
tetraethyl pyrophosphate;
1,1-bis-(p-chlorophenyl)ethanol;
1,1-bis-(chlorophenyl)2,2,2-trichloroethanol;
p-chlorophenyl-p-chlorobenzyl sulfide;
bis-(p-chlorophenoxy)methane;
3-(1-methyl-2-pyrrolidyl)pyridine;
mixed esters of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
1,1-dichloro-2,2-bis(p-ethylphenyl)ethane;
p-dimethylaminobenzenediazo sodium sulfonate;
quinone oxyaminobenzooxohydrazone;
tetramethyl thiuram disulfide;
tetraalkyl thiuram monosulfides;
metal salts of ethylene bisdithiocarbamic acid, e.g., manganese, zinc, iron and sodium salts;
pentachloronitrobenzene;
n-dodecylguanidine acetate (dodine);
n-trichloromethylthiotetrahydrophthalimide (captan);
phenylmercury acetate;
2,4-dichloro-6-(o-chloroaniline)-s-triazine ("Dyrene"®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide;
3,3'-ethylenebis(tetrahydro-4,6-dimethyl-2H-1,3,5-thiadiazine-2-thione);
methylmercury dicyandiamide;
N-ethylmercury-p-toluenesulfonilide;
1,4-dichloro-2,5-dimethoxy benzene;
metal (e.g., iron, sodium and zinc), ammonium and amine salts of dialkyl dithiocarbamic acids;
tetrachloronitroanisole;
hexachlorobenzene;
hexachlorophene;
methylmercury nitrile;
tetrachloroquinone;
N-trichloromethylthiophthalimide;
1,2-dibromo-3-chloropene;
1,2-dibromo-3-chloropropene;
dichloropropane-dichloropropene mixture;
ethyl dibromide;
chloropicrin;
sodium dimethyl dithiocarbamate;
tetrachloroisophthalonitrile;
1-benzimidazole carboxylic acid, 2-carboxyamino-dimethyl ester;
streptomycin;
2-(2,4,5-trichlorophenoxy)propionic acid;
p-chlorophenoxyacetic acid;
1-naphthalene acetamide; and
N-1-naphthylacetamide.

The agricultural chemicals listed above are merely exemplary of the compounds which can be mixed with the compounds of this invention and are not intended to any way limit the invention.

The compositions of this invention will include one or more of the compounds of Formula 1 alone or in combination with the above listed compounds and can in addition contain such diluents, conditioners, solvents, surface active agents and other ingredients as are desired or necessary to provide easy-to-handle formulations such as dusts, wettable powders, solvent solutions, emulsifiable solvent solutions and aerosols.

Surface active agents, when employed, act to wet, disperse, or emulsify and thus assist in the dispersion of the active ingredient in the spray where such is used in application or, in some cases, over the surface to be treated. Useful surface active agents include many anionic, nonionic and cationic agents as have been previously employed in agricultural chemical compositions. A detailed list of such surface active agents may be found in "Detergents and Emulsifiers Annual—1964" (John W. McCutcheon, Inc.).

Compositions which are to be stored or shipped prior to use will ordinarily contain no more than 10% of the surface active agent. At this level and under relatively anhydrous conditions, there is no significant interaction between the surface active agents and the active ingredient.

Useful compositions may include finely divided solid diluents which act predominantly as conditioning agents and handling aids and permit the adjustment of the active ingredient content to a convenient level in wettable powder preparations. In dust formulations, the solid diluent insures flowability and a uniform distribution pattern. Such inert, non-catalytic diluents as talc, diatomaceous earth, pyrophyllite, and kaolinite are preferred. Synthetic silicates, calcium phosphate and the like are also practical.

Other formulation modifiers such as anti-foam agents and anti-corrosion agents can also be used as desired.

The compositions are prepared by any of the methods generally used for chemical compositions of a similar type.

APPLICATION

The bis(dialkylcarbamoyl)disulfides of this invention are sprayed or dusted on the surface to be protected either before or after the mite eggs are laid. The compositions should be used in an amount such that a thin coating of the active ingredient is applied to the surface to be protected. The rates and methods of application can vary as widely as is required to adequately protect the many types of surface, plant, animal and inanimate, which may be the locus of mite infestation sought to be controlled. Generally speaking, the compositions are applied at a rate to provide 0.05 to 1,000 grams of bis(dialkylcarbamoyl)disulfide of this invention per 1,000 square feet of surface to be protected or sanitized. Preferred rates generally range from 0.5 to 500 grams per 1,000 square feet of surface, and most preferred rates for extended effect, are from about 1 to about 250 grams per 1,000 square feet.

The effectiveness of the compounds of formula (1) in preventing mite reproduction and controlling mite infestation is clearly demonstrated by the field and laboratory tests of the following examples.

Example 1

The following formulation is prepared by intimately blending the ingredients and grinding the blend in an air attrition mill until the particle size is substantially less than 5 microns.

|  | Percent |
| --- | --- |
| Bis-(N,N-diisopropylthiocarbamoyl)disulfide | 50 |
| Partially desulfonated sodium lignin sulfonate | 3 |
| Dioctyl ester of sodium sulfosuccinate | 3 |
| Kaolin clay | 44 |

The above 50% wettable powder formulation is dispersed in water to give an active ingredient concentration of 1.2 pounds per 100 gallons of water. Eight uniform Red Delicious apple trees in a Delaware orchard are selected for testing. Four of these are sprayed to run-off, which is approximately 300 gallons per acre, at intervals of one and two weeks during the growing season with the above formulation and the other four trees are left unsprayed. By August 25 the unsprayed trees have developed very high populations of mites, averaging fourteen adults and nineteen eggs per leaf, of the European red mite, *Paratetranychus pilosus*. Due to the feeding of the mites, the foliage is russeted and drops prematurely. Also, the untreated arees have poor twig growth and small fruit. The trees sprayed with bis-(N,N-diisopropylthiocarbamoyl)disulfide are essentially free of mites or eggs. As a result of the excellent mite control, the sprayed trees have foliage of a thrifty, dark green color, and they exhibit good twig growth and fruit size.

Example 2

|  | Percent |
| --- | --- |
| Bis-(N,N-di-sec-butylthiocarbamoyl)disulfide | 5 |
| Sodium alkylnaphthalene sulfonate | 1 |
| Pyrophyllite clay | 94 |

Cotton plants in selected plots are thoroughly dusted at a rate of 40 pounds of dust per acre for each application on June 20 and at two-week intervals thereafter until mid-August with the above dust formulation in addition to a regular insecticidal treatment. Similar plots receive the insecticide application only. By late August the plots receiving only the insecticide have high populations of spider mites, *Tetranychus* spp., which cause the leaves of the cotton plants to turn rusty brown, twist and drop to the ground. The loss of leaves results in the shedding of small bolls and prevents the lint from becoming fully developed. Cotton plants treated with the above dust formulation retain healthy foliage and produce a heavy crop of healthy full-sized bolls.

Example 3

An emulsifiable liquid concentrate is made from the following ingredients in the proportions listed:

|  | Percent |
| --- | --- |
| Bis-(N,N-diisobutylthiocarbamoyl)disulfide | 20 |
| Dimethylsulfoxide | 10 |
| Xylene | 30 |
| Methylene chloride | 30 |
| Blend of alkylaryl sulfonates and polyoxyethene derivatives | 10 |

The ingredients are combined and thoroughly mixed while insuring that moisture is excluded from the composition.

One gallon of the above liquid composition is diluted with five gallons of water, and the resulting emulsion is used to spray the walls, ceiling, nests, roosts, and floor of a chicken house known to be heavily infested with the chicken mite, *Dermanyssus gallinae*. One month after the application the chicken house is free of mites and remains so for an extended period.

Example 4

A wettable powder formulation is prepared from the following ingredients in the proportions given:

|  | Percent |
| --- | --- |
| Bis-(N,N-diethylthiocarbamoyl)disulfide | 30 |
| Methoxychlor | 30 |
| Sodium dioctyl sulfosuccinate | 2 |
| Sodium ligninsulfonate | 2 |
| Pyrophyllite | 36 |

All the ingredients are combined and rotated in a blender until uniformly mixed. The total mix is then air-milled to produce particles essentially less than 40 microns in size.

The wettable powder prepared above is added to water in an amount such that there are two pounds each of bis-(N,N-diethylthiocarbamoyl)disulfide and methoxychlor per 100 gallons of water. The resulting suspension is sprayed at the rate of 10 pounds per acre for each of the active ingredients over a plot in a Bermuda grass turf area in Florida. The area selected for the test is heavily infested with a plant-feeding mite, *Aceria neocynodonis,* and chinch bugs, *Blissus leucopterus insularis.* The chinch bugs are killed in the treated plot and the mite infestation soon disappears. The turf quickly returns to a healthy and attractive condition. In a similar untreated plot both the mites and the chinch bugs continue to multiply and, by their feeding, the Bermuda grass becomes discolored and the turf reflects many unsightly dead spots. Similar plots sprayed with methoxychlor only are free of damage due to chinch bugs but are injured by the high mite infestation.

*Example 5*

A wettable powder formulation is prepared from the following ingredients in the proportions given:

|  | Percent |
|---|---|
| Bis-(N-ethyl-N-isopropylthiocarbamoyl)disulfide | 25 |
| Methoxychlor | 25 |
| Sodium dioctyl sulosuccinate | 2 |
| Sodium ligninsulfonate | 2 |
| Montmorillonite clay | 46 |

All ingredients are combined and rotated in a blender until uniformly admixed. The total mix is then air-milled to produce particles most of which are less than 40 microns in particle size.

A sufficient amount of the above wettable powder is added to water such that there are two pounds per 100 gallons of water of each of the bis-(N-ethyl-N-isopropylthiocarbamoyl)disulfide and methoxychlor. The resulting suspension is then sprayed at weekly intervals on one of a pair of similar, adjacent plots in a green bean field in Florida at the rate of two pounds of each active ingredient per acre. The test area is selected as one in which there is a high infestation of the two-spotted mite, *Tetranychus bimaculatus,* and the Mexican bean beetle, *Epilachna varivestis.* The plot sprayed with the above formulation remains free of both the two-spotted mite and the Mexican bean beetle for the entire growing season and provides a good yield of green beans. The unsprayed plot is attacked by both of the above pests and is damaged to the extent that the yield is greatly reduced. Similar areas sprayed with methoxychlor alone are free from attack by the Mexican bean beetle but are damaged by the two-spotted mite.

*Example 6*

A dust formulation is prepared from the following ingredients in the proportions listed:

|  | Percent |
|---|---|
| Bis-(N-n-butyl-N-methylthiocarbamoyl)disulfide | 5 |
| Captan | 5 |
| Methoxychlor | 5 |
| Sodium alkylnaphthalenesulfate | 1 |
| Pyrophyllite clay | 84 |

The above ingredients are combined and rotated in a blender until uniformly mixed. The composition is then air-milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus telarius,* the rose blackspot, *Diplocarpon rosae,* and the Japanese beetle, *Popillia japonica.* Randomly selected plots dusted at weekly intervals with the above prepared composition to the extent that thorough coverage of the plant is obtained with the formulation, remain free from damage, and produce good yields of bloom throughout the test period.

Plots treated with a dust containing captan and methoxychlor, but without the carbamoyl disulfide compound are free of blackspot and show no Japanese beetle injury. They are, however, seriously damaged by mites.

*Examples 7–31*

The following compounds are formulated as in Example 6 to a free-flowing dust, and are used to dust roses in a similar manner to that of Example 6 with similar outstanding mite control to that exhibited by the bis-(N-n-butyl-N-methylthiocarbamoyl)disulfide of Example 6.

| Example | Compound |
|---|---|
| 7 | bis-(N-ethyl-N-isopropylcarbamoyl)disulfide. |
| 8 | bis-(N,N-di-sec-hexylthiocarbamoyl)disulfide. |
| 9 | bis-(N,N-di-isopropylcarbamoyl)disulfide. |
| 10 | bis-(N,N-di-sec-butylthiocarbamoyl)disulfide. |
| 11 | bis-(N,N-pentamethylenethiocarbamoyl)disulfide. |
| 12 | bis-(N,N-diethylcarbamoyl)disulfide. |
| 13 | bis-(N-hexyl-N-methylthiocarbamoyl)disulfide. |
| 14 | bis-(N,N-di-n-amylthiocarbamoyl)disulfide. |
| 15 | bis-(N,N-di-n-propylthiocarbamoyl)disulfide. |
| 16 | bis-(N-tert-butyl-N-methylthiocarbamoyl)disulfide. |
| 17 | (N-n-butyl-N-ethylthiocarbamoyl)(N'-methyl-N'-isopropylcarbamoyl)disulfide. |
| 18 | bis-(N,N-hexamethylenethiocarbamoyl)disulfide. |
| 19 | bis-(N,N-heptamethylenethiocarbamoyl)disulfide. |
| 20 | bis-(N,N-hexamethylenecarbamoyl)disulfide. |
| 21 | bis-(N-cyclopropyl-N-methylthiocarbamoyl)disulfide. |
| 22 | bis-(N-cyclopentyl-N-methylthiocarbamoyl)disulfide. |
| 23 | bis-(N-cyclohexyl-N-methylthiocarbamoyl)disulfide. |
| 24 | (N,N-diethylcarbamoyl)(N',N'-diethylthiocarbamoyl)disulfide. |
| 25 | bis-(N,N-dicyclohexylthiocarbamoyl)disulfide. |
| 26 | (N,N-dicyclohexylcarbamoyl)(N'-methyl-N'-ethylthiocarbamoyl)disulfide. |
| 27 | bis-(N-cyclopentyl-N-isopropylthiocarbamoyl)disulfide. |
| 28 | (N,N-pentamethylenethiocarbamoyl)(N',N'-diethylthiocarbamoyl)disulfide. |
| 29 | (N,N-hexamethylenecarbamoyl)(N',N'-diisopropylthiocarbamoyl)disulfide. |
| 30 | (N,N-pentamethylenethiocarbamoyl)(N'-ethyl-N'-cyclohexylthiocarbamoyl)disulfide. |
| 31 | (N,N-pentamethylenethiocarbamoyl)(N',N'-octamethylenecarbamoyl)disulfide. |

I claim:
1. A method for controlling arachnids of the order Acarina comprising applying to their eggs an ovicidal amount of a compound of the formula

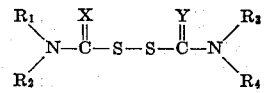

wherein $R_1$ is selected from the group consisting of alkyl of one to 6 carbons and cycloalkyl of three to 6 carbons;

$R_2$ is selected from the group consisting of alkyl of one to 6 carbons and cycloalkyl of three to 6 carbons;

$R_3$ is selected from the group consisting of alkyl of one to 6 carbons and cycloalkyl of three to 6 carbons;

$R_4$ is selected from the group consisting of alkyl of one to 6 carbons and cycloalkyl of three to 6 carbons;

X is selected from the group consisting of oxygen and sulfur; and

Y is selected from the group consisting of oxygen and sulfur; and provided that $R_1$ and $R_2$ can be joined to form a ring of from 5 to 8 carbons, and $R_3$ and $R_4$ can be joined to form a ring of from 5 to 8 carbons, and with the limitation that $R_1$, $R_2$, $R_3$ and $R_4$ cannot all be methyl.

2. A method for controlling arachnids of the order Acarina comprising contacting their eggs with an ovicidal amount of a compound of the formula

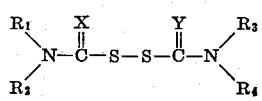

wherein $R_1$ is selected from the group consisting of alkyl of one to 6 carbons and cycloalkyl of three to 6 carbons;

$R_2$ is selected from the group consisting of alkyl of one to 6 carbons and cycloalkyl of three to 6 carbons;

$R_3$ is selected from the group consisting of alkyl of one to 6 carbons and cycloalkyl of three to 6 carbons;

$R_4$ is selected from the group consisting of alkyl of one to 6 carbons and cycloalkyl of three to 6 carbons;

X is selected from the group consisting of oxygen and sulfur; and

Y is selected from the group consisting of oxygen and sulfur; and provided that $R_1$ and $R_2$ can be joined to form a ring of from 5 to 8 carbons, and $R_3$ and $R_4$ can be joined to form a ring of from 5 to 8 carbons, and with the limitation that $R_1$, $R_2$, $R_3$ and $R_4$ cannot all be methyl.

3. The method of claim 2 in which the compound used is bis(N,N,-diisopropylthiocarbamoyl)disulfide.

4. The method of claim 2 in which the compound used is bis(N,N-di-sec-butylthiocarbamoyl)disulfide.

5. The method of claim 2 in which the compound used is bis(N,N-diisobutylthiocarbamoyl)disulfide.

6. The method of claim 2 in which the compound used is bis(N,N-diethylthiocarbamoyl)disulfide.

7. The method of claim 2 in which the compound used is bis(N-ethyl-N-isopropylthiocarbamoyl)disulfide.

8. The method of claim 2 in which the compound used is bis(N-butyl-N-methylthiocarbamoyl)disulfide.

References Cited by the Examiner

UNITED STATES PATENTS

| 2,927,899 | 3/1960 | Goldwasser | 260—567 |
| 3,184,313 | 5/1965 | Rees et al. | 260—567 |

OTHER REFERENCES

King: "Chemicals Evaluated as Insecticides and Repellants at Orlando, Fla.," U.S. Dept. of Agriculture, Agriculture Handbook No. 69, May 1954, p. 155.

JULIAN S. LEVITT, *Primary Examiner.*

STANDLEY J. FRIEDMAN, *Assistant Examiner.*